United States Patent [19]

Brandener

[11] Patent Number: 5,280,888
[45] Date of Patent: Jan. 25, 1994

[54] RESILIENT BUFFER MADE OF METAL WIRE

[75] Inventor: Louis Brandener, Poissy, France

[73] Assignee: Societe Jacques DuBois, Barentin, France

[21] Appl. No.: 856,700

[22] Filed: Mar. 24, 1992

[30] Foreign Application Priority Data

Apr. 5, 1991 [FR] France .................... 91 04183

[51] Int. Cl.$^5$ .............................................. F16F 1/36
[52] U.S. Cl. ................................................... 267/147
[58] Field of Search ............... 267/147, 290, 168, 180

[56] References Cited

U.S. PATENT DOCUMENTS

| | | | |
|---|---|---|---|
| 2,755,079 | 7/1956 | York et al. ........................ | 267/147 |
| 3,186,701 | 6/1965 | Skinner, Jr. ....................... | 267/168 |
| 5,052,404 | 10/1991 | Hodgson ........................... | 267/168 |

FOREIGN PATENT DOCUMENTS

| | | | |
|---|---|---|---|
| 2626041 | 1/1989 | France . | |
| 1298446 | 3/1987 | U.S.S.R. ............................. | 267/168 |
| 836519 | 9/1958 | United Kingdom . | |

*Primary Examiner*—Matthew C. Graham
*Attorney, Agent, or Firm*—Griffin, Butler, Whisenhunt & Kurtossy

[57] ABSTRACT

The buffer is preferably made by a method comprising the step of making a substantially cylindrical preform by helically winding a strip made of resilient metal wire in at least two layers of opposite pitch, and the step of compressing the preform axially.

4 Claims, 1 Drawing Sheet

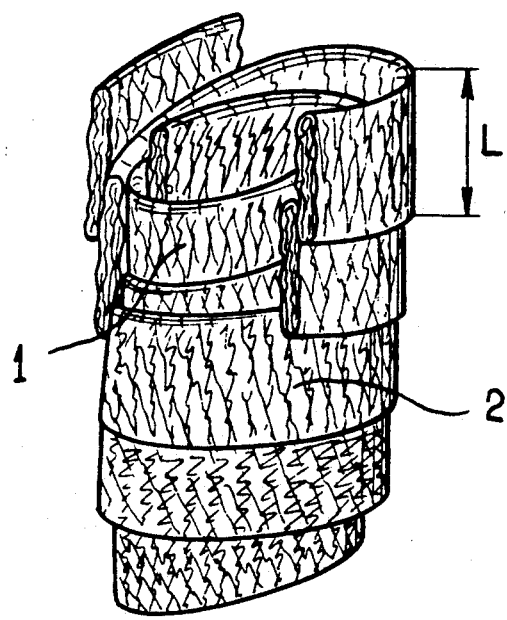
FIG_1
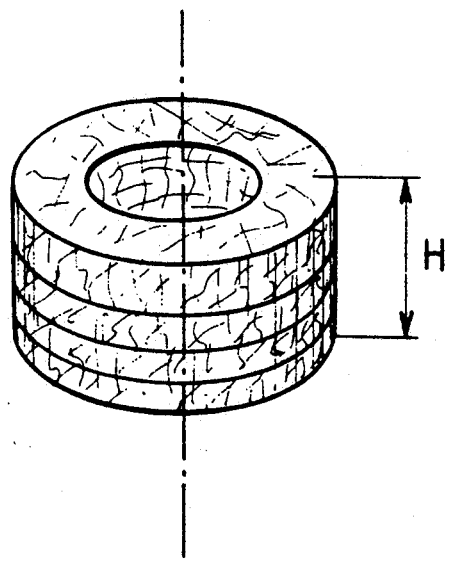
FIG_2

RESILIENT BUFFER MADE OF METAL WIRE

The present invention relates to a resilient buffer made of metal wire.

BACKGROUND OF THE INVENTION

Antivibration resilient buffers are known that are made from a rolled-up knitted metal strip to form an annular or a solid cylindrical preform which is subsequently compressed axially in a mold so as to tangle together the stitches of the knit and thus impart cohesion to the buffer adapted to the loads to which the buffer is subjected in use.

For given knit density, the deflections to which the buffer is subjected under load increase with increasing load and also with increasing initial no-load height of the buffer.

To enable the buffer to withstand high static loads while nevertheless being capable of bending under the effect of momentary overloads, it is necessary for the buffer to be tall relative to its outside diameter. The ratio of height to diameter can thus reach and even easily exceed unity.

When a sleeve, and more particularly a sleeve that is tall relative to its diameter, is subjected to a high axial load, it tends to deform with its side surface then taking up a barrel-shaped appearance. This gives rise to a loss of buffer stiffness and its performance is degraded.

A past proposal for mitigating this drawback consists in enveloping the metal wire strip or the buffer itself in a thin metal sheet or in disposing metal rings around the buffer. Those techniques have the advantage of imparting good radial stiffness, but they reduce the axial flexibility of the buffer whose antivibration properties suffer accordingly.

Proposals have also been made to place a thin helically-wound metal wire around the buffer which becomes buried in the spiral-wound metal knit on axial compression. That solution is satisfactory as to the radial stiffness obtained and as to retaining the axial flexibility of the buffer, however it is relatively expensive and complex to implement

SUMMARY OF THE INVENTION

The present invention provides a resilient buffer comprising a series of turns of a strip made from resilient metal wire, in which the turns are disposed in at least two helical layers of opposite pitch.

Thus, without there being any need to place some other material around the metal buffer, it has been observed that the stitches of metal wire tangle together thoroughly both in the radial direction and in the axial direction, thereby obtaining satisfactory performance both with respect to withstanding radial deformation and with respect to axial flexibility.

The buffer of the invention is preferably made by a method comprising the step of making a substantially cylindrical preform by helically winding a strip made of resilient metal wire in at least two layers of opposite pitch, and the step of compressing the preform axially.

According to advantageous aspects of the invention, the helical winding includes turns that overlap and the width of the strip is substantially equal to the height of the buffer after axial compression.

BRIEF DESCRIPTION OF THE DRAWING

An embodiment of the invention is described by way of example with reference to the accompanying drawing, in which:

FIG. 1 is a partially cutaway perspective view of a preform for a resilient buffer of the invention; and FIG. 2 is a perspective view of the buffer obtained after compressing the preform axially.

DETAILED DESCRIPTION

With reference to the figures, the buffer of the invention is made from a strip of resilient metal wire, e.g. a strip obtained by flattening a tubular metal knit. The metal wire strip is rolled up to constitute at least one first layer 1 having turns that overlap, and a second layer 2 also having turns that overlap and that are disposed in the opposite pitch to the turns of the first layer. It may be observed that the preform obtained in this way can be made continuously by winding the strip on a mandrel and by displacing it parallel to the winding axis in a first direction, e.g. downwards as shown in FIG. 1, and then reversing the direction in which the strip is displaced so that it forms a second layer covering the first layer of opposite pitch, e.g. by moving upwards as shown in FIG. 1. The resulting preform can be held together either by needling the end of the strip onto an immediately adjacent turn of the strip, or by stapling, or by installing retaining rings.

The preform is then placed in a die. If retaining rings have been used, it is preferable to remove them when inserting the preform in the die. The preform is then compressed axially, thereby obtaining the resilient buffer shown in FIG. 2. Although the outer turns of the strip are shown in this figure by means of solid lines, in practice the boundaries between two adjacent turns are difficult to see on the axially-compressed buffer because of the tangling between the metal wire stitches.

In practice, it has been observed that a strip of width L substantially equal to or slightly less than the height H of the buffer after axial compression gives very good results. However, this characteristic is not fundamental. In particular, the same width of strip may be used for making buffers of different heights, merely by choosing an appropriate number of turns for the desired height of the resilient buffer as a function of the amount of compression to be imparted during axial compression.

Naturally, the invention is not limited to the embodiment described and variants may be applied thereto without going beyond the ambit of the invention. In particular, although the resilient buffer of the invention is preferably made from a strip of knitted metal wire, it is also possible to make it from a strip of woven metal wire.

Similarly, even though the embodiment shown of the resilient buffer is annular, it is possible to make a solid buffer by winding the strip on a mandrel of very small diameter such that the axial bore of the preform disappears during axial compression.

The buffer of the invention may also be made fluid-tight to enable it to be used as a resilient washer in an exhaust pipe coupling for an internal combustion engine. Such sealing can be obtained, for example, by winding a metal foil on the mandrel before winding the metal wire strip thereon. The foil crinkles during axial compression, thereby providing sealing while not significantly altering the axial stiffness of the buffer.

I claim:

1. A resilient buffer, comprising a series of turns of resilient knitted metal wire in at least two helical layers of opposite pitch and being axially compressed so as to entangle the metal wire sufficiently that the buffer is permanently compressed.

2. A method of making a resilient buffer comprising the step of making a substantially cylindrical preform by helically winding a strip made of resilient knitted metal wire in at least two layers of opposite pitch, and the step of compressing the preform axially so as to entangle the metal wire sufficiently that the buffer is permanently compressed.

3. A method according to claim 2, wherein the helical winding includes turns that overlap.

4. A method according to claim 2, wherein the width of the strip is substantially equal to the height of the buffer after axial compression.